(12) United States Patent
Hanaway et al.

(10) Patent No.: US 6,357,613 B1
(45) Date of Patent: Mar. 19, 2002

(54) NON-ROTATING DRAFT KEY RETAINER

(75) Inventors: John Hanaway, Orchard Lake; Ronald Hanaway, Farmington Hills; William C. Vandye, Livonia; Gary M. Marsh, Fenton, all of MI (US)

(73) Assignee: General Bearing Corporation, Milford, MI (US)

( * ) Notice: Subject to any disclaimer, the term of this patent is extended or adjusted under 35 U.S.C. 154(b) by 0 days.

(21) Appl. No.: 09/633,909

(22) Filed: Aug. 8, 2000

(51) Int. Cl.[7] .............................................. B61G 7/00
(52) U.S. Cl. ...................................................... 213/50.5
(58) Field of Search ................................ 213/50.5, 155, 213/156; 403/220, 274, 278, 315, 316; 411/351, 513, 515

(56) References Cited

U.S. PATENT DOCUMENTS

| | | | |
|---|---|---|---|
| 475,746 A | * 5/1892 | Assorati | 411/351 |
| 1,999,352 A | * 4/1935 | Barthelemy | 213/50.5 |
| 2,056,269 A | * 10/1936 | Harbert | 411/351 |
| 2,534,125 A | * 12/1950 | Hayes | 213/50.5 |
| 2,588,064 A | * 3/1952 | Webb | 411/351 |
| 2,593,790 A | 4/1952 | Pietzsch | 85/5 |
| 2,653,505 A | * 9/1953 | Pietzsch | 411/351 |
| 3,104,920 A | 9/1963 | Smith | 308/40 |
| 3,139,193 A | 6/1964 | May | 213/43 |
| 3,489,053 A | 1/1970 | Songer | 85/5 |
| 3,556,311 A | 1/1971 | Kinnecom | 213/8 |
| 3,587,869 A | 6/1971 | Atkinson et al. | 213/8 |
| 3,673,914 A | 7/1972 | Randolph et al. | 85/5 N |
| 3,802,577 A | 4/1974 | Niggemeier et al. | 213/50.5 |
| 3,841,230 A | 10/1974 | Hasten, Jr. | 105/221 K |
| 5,145,076 A | 9/1992 | Murphy et al. | 213/155 |
| 5,630,519 A | 5/1997 | Burke et al. | 213/155 |
| 5,736,088 A | 4/1998 | Burke et al. | 264/237 |

* cited by examiner

*Primary Examiner*—Mark T. Le
(74) *Attorney, Agent, or Firm*—Young & Basile, P.C.

(57) ABSTRACT

A non-rotating retainer for a draft key having a circular opening, the non-rotating retainer including a retainer pin and a retainer lock member configured for being received in the circular opening. The retainer lock member is formed from a one-piece flat metallic stock blank and having a U-shaped first end for fitting around the end of the draft key and a projection formed on the retainer lock member, the projection spaced from the U-shaped first end at a distance corresponding to the thickness of the draft key, the retainer pin having a cylindrical portion and an integral head. Along one side of the retainer pin a notch is formed corresponding to a portion of the flat metallic stock blank for receiving the same. The second end of the retainer lock member is adapted for bending over the head of the retainer pin.

5 Claims, 1 Drawing Sheet

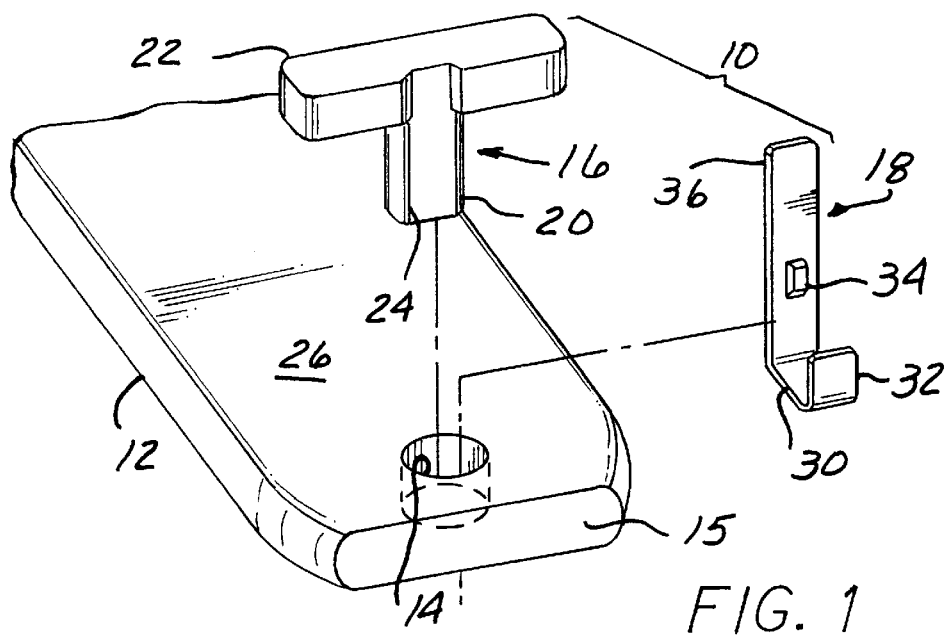
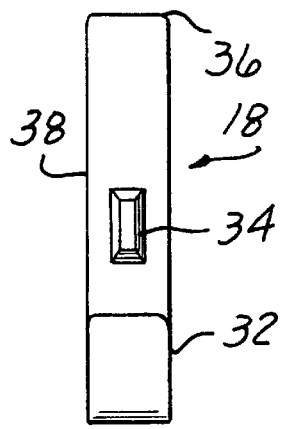
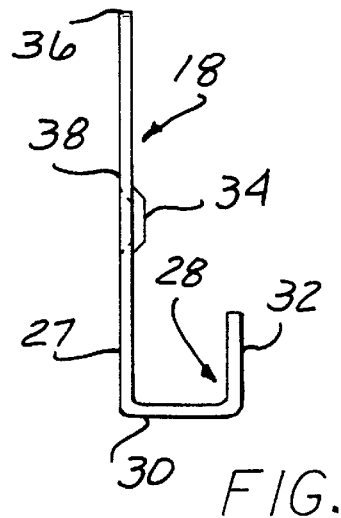
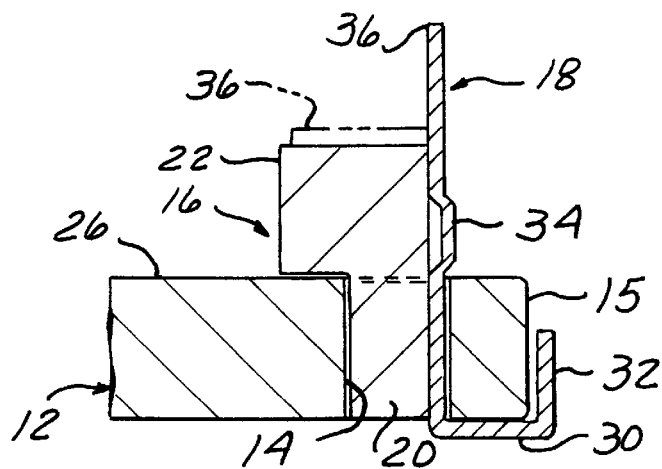

NON-ROTATING DRAFT KEY RETAINER

BACKGROUND OF THE INVENTION

The present invention relates to a non-rotating retainer for installation in a draft key for railway cars.

In the environment of railway cars, it is known to use a draft key for securing a coupler to a draft or center sill. The draft key extends through a horizontally positioned guide slot in the draft sill. At one end of the draft key there is a vertically extending opening for receiving a draft key retainer. The draft key retainer is positioned in the opening to insure that the draft key remains in place to hold the coupler within the draft sill. It is required by the AAR to provide a draft key retainer lock for the draft key retainer to ensure that the retainer and draft key do not become disengaged from their connections.

It is desirable to provide a draft key retainer lock which is easy to manufacture as well as inexpensive. It is further desirable to provide a draft key retaining lock that is easily installed and reliable in use.

SUMMARY OF THE INVENTION

A non-rotating retainer for a draft key for a railroad car is provided in the present invention for insertion into a round through opening of the draft key. According to one aspect of the invention the retainer includes a retainer pin having a solid cylindrical portion and an integral head attached thereto wherein the solid cylindrical portion is sized to be received within the round through opening of the draft key. A retainer lock member formed from a one-piece flat metallic blank and having a uniform width along its entire length is configured to be positionable adjacent the retainer pin in the opening and to secure the retaining pin within the opening of the draft key.

According to another aspect of the invention, the retainer lock member has a first end bent into a U-shaped formation for fitting about the end of the draft key. The U-shaped formation of the retainer lock member has an integral portion generally perpendicular to the retainer lock member and an integral portion parallel to the retainer lock member. The retainer lock member according to another aspect of the invention may have a projection formed along one front surface and is spaced from the generally perpendicular portion of the U-shaped formation by a distance corresponding to the thickness of the draft key. The projection and the U-shaped formation prevent movement of the retainer lock member in the opening.

In another aspect of the invention the retainer pin has a slot extending along the entire length of the cylindrical portion and integral head configured and sized to receive a portion of the retainer lock member therein.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is an exploded view of a retainer pin and retainer lock member for a draft key according to the present invention;

FIG. 2 is a side sectional view of the retainer installed in the draft key;

FIG. 3 is a side elevational view of the retainer lock member; and

FIG. 4 is a top elevational view of the retainer lock member.

DESCRIPTION OF THE PREFERRED EMBODIMENT

Referring now to the drawings, FIG. 1 shows an exploded view of a non-rotating retainer 10 for a draft key 12. Only one end of the draft key 12 is shown. It is understood that at the other end of the draft key 12, a retaining head (not shown) will be provided. At the first and illustrated end 15, as shown in the Figures, the draft key 12 includes a vertically extending round through opening 14 for receiving the retainer 10.

The non-rotating retainer 10 includes a retainer pin, 16 and a retainer lock member 18. The retainer pin 16 has a solid cylindrical portion 20 and integral head 22 attached thereto. Along the entire length of one side of the retainer pin, a planar surface 24 is notched into the surface of the cylindrical portion 20 and integral head 22. The planar surface 24 is sized for receiving a portion 27 of the retainer lock member 18 therein. The cylindrical portion 20 of the retainer pin is sized to be received within the circular opening 14 of the draft key 12. The integral head 22 rests on an upper surface 26 of the draft key 12.

The retainer lock member 18 as shown in the Figures, and especially FIGS. 3 and 4 is an elongated rectangular one-piece flat metallic blank that is formed to provide the locking features for the retainer 16. The retainer lock member 18 is made from a mild steel that is corrosion resistant and formed by hot rolling. In the illustrated embodiment the rectangular retainer lock member 18 is approximately 5½" (inches) long by ¾" wide. The stock material used for lock member 18 has a thickness of 5/32". A first end 28 of the retaining lock member 18 is bent into a U-shaped configuration. The U-shaped configuration of the first end 28 includes a portion 30 that is perpendicular to the second end portion 36 and center portion 38 of the retaining lock member 18. The U-shaped configuration of the first end 28 has another portion forming a lip 32 that is in a spaced but parallel plane to the second end and center portions 36 and 38 respectively of the retainer lock member 18.

A dimple and a corresponding protrusion 34 are formed in the center portion 38 of the rectangular retainer lock 18. The protrusion 34 is formed by a small die punched into an opposing side 27 of the rectangular lock 18 such that the protrusion 34 extends in the direction of the parallel and spaced portion 32 of the first end 28. The protrusion 34 is raised to generally the height of the thickness of the rectangular retainer lock member 18. The protrusion 34 is spaced from the perpendicular portion 30 of the first end 28 by a distance of approximately the distance between the peripheral edge of the circular opening 14 and the end of the draft key. The protrusion 34 is centered across the width of the retainer lock member 18 as shown in FIG. 4.

The non-rotating retainer 10 is positioned in the draft key 12 such that the retainer lock member 18 is initially placed in the circular opening 14 wherein the protrusion 34 and the U-shaped first end 28 of the retainer lock member 18 are facing the first end 15 of the draft key 12. The retainer lock member 18 is positioned in the circular opening 14 such that lip 32 extends adjacent to the first end surface 15 of the draft key 12. Protrusion 34 then rests against the upper surface 26 of the draft key 12. The U-shaped first end 28 of the retainer lock member 18 together with the protrusion 34 prevents the lock member 18 from vertical movement. The retainer pin 16 is then placed adjacent to the retainer lock member 18 such that a back surface portion 27 of the retainer lock member 18 fits within the planar slot 24 of the retainer pin 16. When the retainer pin 16 is placed within the circular opening 14, the second end 36 of the retainer lock member 18 extends above the upper surface 26 of the retainer pin 18. The second end 36 of the retainer lock member 18 forms a flanged portion which can then be bent over the upper surface 26 of the retainer pin 16 (as shown in phantom in FIG. 2) to provide a final locking means for the draft key 12.

The configuration of the retainer 10 of the present invention including the retainer pin 16 having a notched surface 24 and the retainer lock member 18 made of a rectangular stock metal provides a retainer that is inexpensive and easy to manufacture in that the retainer lock member 16 can easily be stamped and bent into the proper configuration providing a locking means which does not require extra pieces that need to be welded or otherwise attached to form the locking member.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A non-rotating retainer for a draft key for a railroad car, said draft key having a through circular opening for receiving said retainer, the retainer comprising:

a retainer pin having a solid cylindrical portion and an integral head attached thereto, wherein said solid cylindrical portion is sized to be received in the circular opening; and a retainer lock member formed from a one piece flat metallic blank and having a uniform width along its entire length, wherein said retainer lock member is positionable against said retaining pin in the circular opening and wherein the retainer lock member has first end bent in a U-shaped formation for fitting about the end of the draft key, wherein the U-shaped formation has a portion generally perpendicular to the retainer lock member and a portion parallel to the retainer lock member.

2. The non-rotating retainer of claim 1, wherein the retainer lock member has a second end bendable over the integral head of the retainer pin to secure said retainer pin in place.

3. The non-rotating retainer of claim 1, wherein the retainer lock member has a projection formed along one flat surface and a corresponding dimple formed on the opposing side.

4. The non-rotating retainer of claim 3, wherein the projection is spaced from the generally perpendicular portion of the U-shaped formation by a distance corresponding to the thickness from the circular opening and the end of the draft key.

5. The non-rotating retainer of claim 1, therein the retainer pin has a notch formed along the solid cylindrical portion and integral head, said notch configured for receiving a portion of the flat metallic retainer lock member.

\* \* \* \* \*